(12) United States Patent
Hatomoto

(10) Patent No.: US 8,672,350 B2
(45) Date of Patent: Mar. 18, 2014

(54) CYLINDRICAL FILTER FOR GAS GENERATOR

(75) Inventor: Atsushi Hatomoto, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 117 days.

(21) Appl. No.: 13/117,504

(22) Filed: May 27, 2011

(65) Prior Publication Data

US 2011/0300030 A1   Dec. 8, 2011

Related U.S. Application Data

(60) Provisional application No. 61/353,521, filed on Jun. 10, 2010.

(30) Foreign Application Priority Data

Jun. 8, 2010   (JP) .................................. 2010-130825

(51) Int. Cl.
*B60R 21/264* (2006.01)
*B01D 39/12* (2006.01)

(52) U.S. Cl.
USPC ........... 280/741; 280/736; 55/526; 29/896.62

(58) Field of Classification Search
USPC .......... 280/741, 736; 55/526, 525; 29/896.62, 29/902; 102/530, 531
See application file for complete search history.

(56) References Cited

U.S. PATENT DOCUMENTS

| | | | |
|---|---|---|---|
| 5,087,070 A | 2/1992 | O' Loughlin et al. | |
| 5,829,785 A * | 11/1998 | Jordan et al. ................... | 280/741 |
| 5,855,635 A * | 1/1999 | Rice ................................. | 55/486 |
| 6,123,359 A * | 9/2000 | Cabrera et al. ................ | 280/741 |
| 6,474,685 B1 * | 11/2002 | Meixner et al. ................ | 280/741 |
| 6,491,321 B1 * | 12/2002 | Nakashima et al. .......... | 280/736 |
| 6,722,694 B1 | 4/2004 | Nakashima et al. | |
| 2007/0214768 A1 | 9/2007 | Koyama et al. | |
| 2008/0264022 A1 | 10/2008 | Zengerle et al. | |
| 2009/0115175 A1 * | 5/2009 | Nishimura et al. ........... | 280/741 |
| 2010/0146922 A1 * | 6/2010 | Greenwood .................... | 55/523 |

FOREIGN PATENT DOCUMENTS

| | | |
|---|---|---|
| DE | 198 29 989 A1 | 1/2000 |
| EP | 1127753 A1 | 8/2001 |
| EP | 1 707 451 A1 | 10/2006 |
| JP | 5-213147 A | 8/1993 |
| JP | 2000-198409 A | 7/2000 |
| JP | 2001-225712 A | 8/2001 |
| JP | 2001-301561 A | 10/2001 |
| JP | 2005-193762 A | 7/2005 |
| WO | WO 2008/143606 A1 | 11/2008 |

OTHER PUBLICATIONS

International Search Report issued in International Patent Application No. PCT/JP2011/061702 on Nov. 10, 2011.

* cited by examiner

*Primary Examiner* — Paul Dickson
*Assistant Examiner* — Keith Frisby
(74) *Attorney, Agent, or Firm* — Birch, Stewart, Kolasch & Birch, LLP

(57) ABSTRACT

A cylindrical filter for a gas generator includes, a plurality of layers made of a porous metal plate in which a compressive strength (S1) of a predetermined region in at least one end in the height direction is set smaller than a compressive strength (S2) of a portion other than the S1 region, the porous metal plate being selected from the group consisting of expanded metal, metal lath, and perforated metal, and the S1 region corresponding to a region of 5 to 20% in length from both ends with respect to the overall height.

7 Claims, 4 Drawing Sheets

CYLINDRICAL FILTER FOR GAS GENERATOR

This nonprovisional application claims priority under 35 U.S.C. §119(a) to Patent Application No. 2010-130825 filed in Japan on 8 Jun. 2010 and 35 U.S.C. §119(e) to U.S. Provisional Application No. 61/353,521 filed on 10 Jun. 2010, both of which are incorporated by reference.

BACKGROUND OF INVENTION

1. Field of Invention

The present invention relates to a cylindrical filter for a gas generator for use in a restraining apparatus and the like, and also to a gas generator using the cylindrical filter.

2. Description of Related Art

A gas generator that uses a solid gas generating agent uses a filter to cool a combustion gas and collect combustion residues. While known filters include those in which a metallic mesh or wires are woven in many layers and then compression-molded and those in which wires are wound in many layers, when the used gas generating agent generates a low-temperature combustion gas or produces only a small amount of combustion residues, filters that are lighter than those described above can be used instead.

JP-A No. 2000-198409 discloses an example in which expanded metal is molded into a cylindrical body and used as a filter. In a gas generator shown in FIG. 1, a combustion chamber 22 is formed inside a housing 3. A gas generating agent 6 and a filter 7 are arranged inside the combustion chamber 22. The filter 7 is cylindrically formed by winding expanded metal in many layers. An upper end of the filter 7 is in contact with a diffuser shell 1, and a lower end thereof is in contact with a closure shell 2.

In particular, a cushion 50 is disposed on an upper end surface 28 of the filter 7. The cushion 50 prevents short-passing of combustion gas between the filter 7 and the diffuser shell 1.

Further, JP-A No. 2001-301561 discloses a filter using a layer material with different specifications for each layer. In particular, an example shown in FIG. 3 discloses an example of a filter using expanded metals with different pitch ratios for an inner layer and an outer layer.

However, although expanded metal and metal lath are favorable in view of weight reduction, elasticity is low by itself. Therefore, when expanded metal or metal lath is disposed in the gas generator as a filter according to JP-A No. 2000-198409, gaps formed at abutting portions on both ends are less likely to be resolved and a short-passing of combustion gas is more likely to occur. As a result, a cushion member 50 such as that described in JP-A No. 2000-198409 (a cushion member described in paragraph 45 and having a short-passing preventing portion 51) has to be disposed.

FIGS. 2 and 5 and paragraph 46 in JP-A No. 5-213147 describe both ends of layers 154 and 156 which form a filter being folded.

However, the layer 154 is made of a ceramic fiber mat (in paragraph 33) which has, in entirety, a uniform strength and which can be easily folded, and the layer 156 is made of a nickel felt material (in paragraph 33) which has, in entirety, a uniform strength and which can be easily folded.

Claim 8 and paragraph 27 in JP-A No. 2005-193762 describe that, in a three-layer cylindrical filter that is manufactured by winding a metallic wire, a second layer is protruded from an end surface to be squashed and tightly attached when disposing a filter in a gas generator, whereby short-passing is prevented.

SUMMARY OF INVENTION

The present invention provides a cylindrical filter for a gas generator, including:

a plurality of layers made of a porous metal plate in which a compressive strength (S1) of a predetermined region in at least one end in the height direction is set smaller than a compressive strength (S2) of a portion other than the S1 region, the porous metal plate being selected from the group consisting of expanded metal, metal lath, and perforated metal, and the S1 region corresponding to a region of 5 to 20% in length from both ends with respect to the overall height.

The present invention provides a gas generator, including a housing, a solid gas generating agent as a gas source and the above shown cylindrical filter, disposed in the housing, wherein the both ends of the cylindrical filter in the height direction are in press-contact with an inner wall surface of the housing and the filter is fixed to the housing by squashing the range of S1 of the cylindrical filter in the axial direction, and a member for preventing leakage of combustion gas from a press-contact portion of the cylindrical filter and the housing is not disposed at the press-contact portion.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

Figure 1:
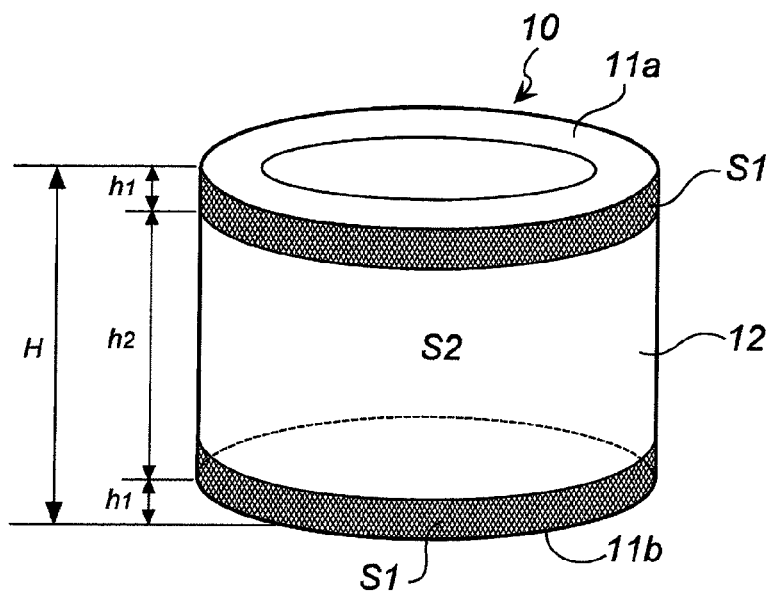
FIG. 1 shows a perspective view of a filter according to the present invention.

The present invention provides a filter capable of improving attachment when disposed inside a gas generator and thereby eliminating the need for a combustion gas short-passing preventing member, and a gas generator with reduced weight due to the use of such filter.

The invention provides preferable embodiments 2, 3, 4 and 5 of the filter.

The embodiment 2 is the cylindrical filter for a gas generator of the invention, wherein a difference between S1 and S2 is a difference due to an opening area of holes per unit area in the S1 region being set greater than an opening area of holes per unit area in the S2 region.

The embodiment 3 is the cylindrical filter for a gas generator of the invention, wherein a difference between S1 and S2 is a difference due to; an opening area of holes per unit area in the S1 region being set greater than an opening area of holes per unit area in the S2 region, and a thickness in the range of S1 being set smaller than a thickness in the range of S2.

The embodiment 4 is the cylindrical filter for a gas generator of the invention, wherein a difference between S1 and S2 is a difference due to a thickness in the S1 region being set smaller than a thickness in the S2 region.

The embodiment 5 is the cylindrical filter for a gas generator of the invention, wherein the porous metal plate is rolled plural times so as to form a cylindrical shape and a rolling end is welded and fixed.

Compressive strength is a known characteristic and represents an ability to resist compressive stress that is applied to the cylindrical filter from both ends in the axial direction.

In the cylindrical filter, a compressive strength (S1) in one end or both ends in the height direction is set smaller than a compressive strength (S2) of a portion other than the one end or both ends.

In the present invention, a region of the compressive strength (S1) will be referred to as an "S1 region" and a region of the compressive strength (S2) will be referred to as an "S2 region".

When disposing the cylindrical filter inside the gas generator (inside a housing of the gas generator), an inner wall surface of the housing (one or both of inner wall surfaces of a top surface and a bottom surface) and one end or both ends of the cylindrical filter are brought into press-contact (abutting in a state where pressure is applied in one or both sides in the axial direction) with each other. Depending on a form of the gas generator, a retainer (for example, a "filter means supporting member 353" described in paragraph 150 and FIG. 19 in JP-A No. 2001-225712) may be disposed between the inner wall surface of the housing and the cylindrical filter. In this case, the retainer and the cylindrical filter are brought into press-contact with each other.

When the inner wall surface of the housing and the cylindrical filter are brought into press-contact with each other as described above, while one end or both ends (S1 range) of the cylindrical filter is squashed in the axial direction, a remaining portion (S2 range) is not deformed and retains its original shape. Consequently, the cylindrical filter is fixed to the housing and an attachment strength between the housing and the cylindrical filter can be increased.

Moreover, degrees of S1 and S2 are determined in consideration of pressure applied during an assembly process of the gas generator.

The S1 region is 5 to 20% in length from both ends of the cylindrical filter with respect to an overall height and, preferably, 10 to 15% in length. For example, when formed on both ends of the cylindrical filter, assuming that an overall height of the cylindrical filter is 100 mm, the S1 region is between 5 to 20 mm (preferably, 10 to 15 ram) respectively from both ends (0 mm), and a remaining portion corresponds to the S2 region.

Means for causing a difference between S1 and S2 (a difference in compressive strength) is not particularly limited and the difference can be obtained by adjusting materials, structure, shape, and the like of the cylindrical filter.

As one of the means for causing a difference between S1 and S2 (a difference in compressive strength), a method can be applied in which an opening area of holes (A1) per unit area within the S1 region of the cylindrical filter is set greater than an opening area (A2) of holes per unit area within the S2 region.

By satisfying a relationship of opening area (A1)>opening area (A2), the compressive strength of the S1 region having the opening area (A1) becomes smaller and the S1 region becomes more easily squashed.

As methods for adjusting the opening area (A1) and the opening area (A2), the followings can be applied;
(I) a method of varying an opening area per unit area by equalizing opening diameters of the holes but varying the number of holes per unit area,
(II) a method of varying an opening area per unit area by differentiating the opening diameters of holes, or
(III) a method that combines the methods (I) and (II) described above.

As another means for causing a difference between S1 and S2 (a difference in compressive strength), a method can be applied in which a thickness (T1) of the S1 region of the cylindrical filter is set smaller than a thickness (T2) of the S2 region.

By satisfying a relationship of thickness (T1)<thickness (T2), the compressive strength of the S1 region having the thickness (T1) becomes smaller and the region S1 becomes more easily squashed.

By laminating a plurality of porous metal plates respectively selected from expanded metal, metal lath, and perforated metal, a filter can be readily molded, rigidity of the entire filter can be increased, and weight can be reduced in comparison to a filter molded by winding a metal wire.

Cylindrical filters manufactured by applying various known methods can be used as the cylindrical filter according to the present invention. However, as a preferred cylindrical filter, a cylindrical filter can be used in which the porous metal plate is wound multiple times so as to form a cylindrical shape and a winding end is welded and fixed.

While such a method is advantageous in that manufacturing is simple, there is a problem in that unevenness is likely to be formed on both end surfaces of a finished product.

However, when the cylindrical filter according to the present invention is used with both end surfaces thereof squashed and attached to a gas generator, unevenness on both end surfaces no longer pose a problem and only advantages of the manufacturing method described above can be utilized.

The invention provides the above shown gas generator.

With a gas generator that uses a solid gas generating agent as a gas source, a "short-passing" should be prevented in which a combustion gas is discharged from a gas discharge port without passing through the filter. Conventionally, as in the gas generator according to JP-A No. 2000-198409, a cushion member 50 having a short-passing preventing portion 51 is disposed.

However, with the gas generator according to the present invention, since the press-contact portion of the cylindrical filter and the housing has a high degree of close attachment, a member for preventing a "short-passing" need not be separately disposed. Consequently, the weight of the gas generator can be reduced by just as much.

The cylindrical filter according to the present invention is formed of a porous metal plate, and the weight of the filter itself can be reduced in comparison to those in which a metallic mesh or wires are woven in many layers and then compression-molded and those in which a wire is wound in many layers.

In addition, when the cylindrical filter according to the present invention is used in a gas generator, since a short-passing preventing member such as in the gas generator according to the conventional art (JP-A No. 2000-198409) described above is no longer necessary, the weight of the gas generator can be reduced by just as much.

Embodiments of Invention (1) Cylindrical Filter of FIG. 1

Figure 2:
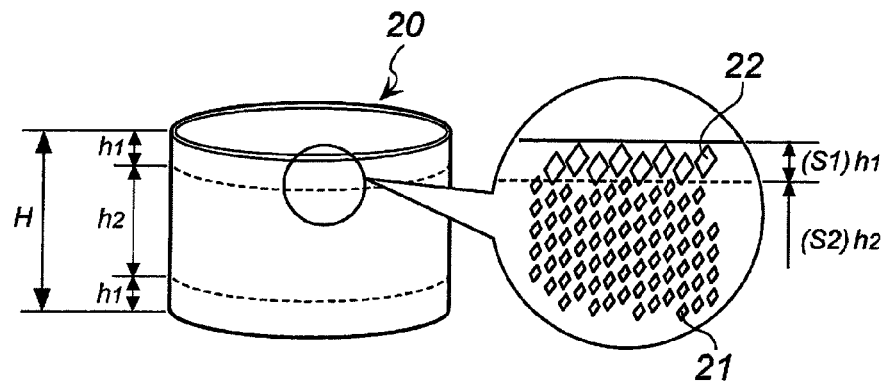
FIG. 2 shows an explanatory diagram of a structure of the filter shown in FIG. 1.

A cylindrical filter 10 shown in FIG. 1 includes end surfaces 11a and 11b and a peripheral surface 12, and has a plurality of layers formed by metal plates 20 having a large number of holes 21 and 22 shown in FIG. 2. FIG. 2 shows a metal plate (or a cylindrical metal plate) 20 that forms a single layer.

In the cylindrical filter 10, compressive strengths of a region of a height (length) h1 (shown as a shaded part in FIG. 1) from the end surface 11a (i.e. S1 region) and a region of a height (length) h1 (shown as a shaded part in FIG. 1) from the end surface 11b (i.e. S1 region) are the same.

In addition, a compressive strength of a region of a remaining portion which has a height (length) of h2 (=H−2h1) (i.e. S2 region) differs from the S1 range and satisfies a relationship of S1<S2.

Moreover, in the cylindrical filter 10 shown in FIG. 1, the S1 region can be formed only on one end of the filter in accordance with a structure of a gas generator to which the filter is attached.

As shown in FIG. 2, in the metal plate 20, an opening area of the hole 22 in a region of h1 (S1 region) is significantly greater than an opening area of the hole 21 in a region of h2 (S2 region). Therefore, an opening area (A1) per unit area in the S1 region is greater than an opening area (A2) per unit area in the S2 region, and the compressive strengths satisfy a relationship of S1<S2. In this case, the opening area (A1) and the opening area (A2) favorably satisfy a range of A2/A1=0.1 to 0.6.

Figure 3:
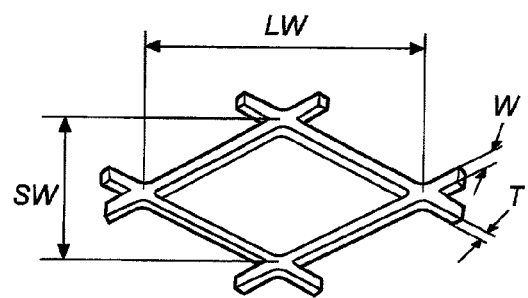
FIG. 3 shows a partially enlarged view of FIG. 2.

The holes 21 and 22 of the metal plate 20 shown in FIG. 2 have opening shapes such as that shown in an enlarged view in FIG. 3.

A cold-rolled steel plate with a thickness of 0.4 mm can be used as the metal plate 20. For example, a plate-like metal lath can be used, which has a thickness T of 0.05 to 0.6 mm, a width W of 0.3 to 1.5 mm, a center-to-center distance SW in the short direction of the mesh of 1.5 to 3 mm, and a center-to-center distance LW in the long direction of the mesh of 1 to 6 mm in Japanese Industrial Standards (JIS) G3351.

Next, a method of manufacturing the filter 10 shown in FIG. 1 will be described with reference to FIGS. 4(a) and (b).

In order to produce the filter 10 shown in FIG. 1, a method in which a plurality of cylindrical metal plates with different diameters are combined, a method in which an elongated metal plate is wound from an end, a method in which a plurality of metal plates are laminated and then molded into a cylindrical shape, or the like are employed. Hereinafter, the method in which an elongated metal plate is wound from an end will be described.

In a metal plate 30 shown in FIG. 4(a), a large number of large incisions 32 are formed in both end-side regions (corresponding to the S1 region) in a width direction, and a large number of small incisions 31 are formed in a middle region (corresponding to the S2 region).

In addition, by pulling the metal plate 30 toward both sides in the longitudinal direction (directions indicated by the arrows in the drawing), holes (openings) (refer to FIG. 2) corresponding to the sizes of the incisions 31 and 32 are formed, and the metal plate 30 becomes an elongated porous metal plate (metal lath) 20 for manufacturing the filter 10.

Next, as shown in FIG. 4(b), the elongated porous metal plate 20 is wound from an end, and a winding end is welded and fixed. An inner diameter and an outer diameter are adjusted appropriately according to a gas generator to be applied.

Figure 5:
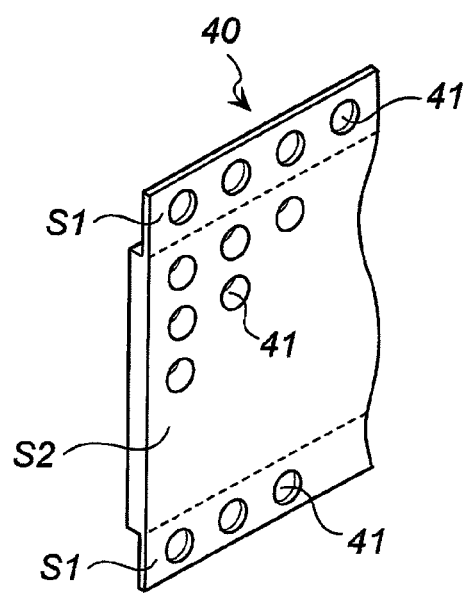
FIG. 5 shows an explanatory diagram of a structure of a filter according to another embodiment.

(2) Metal Plate for Filter Manufacturing Shown in FIG. 5

FIG. 5 is a partial perspective view of an elongated perforated metal 40 to be used as a metal plate for manufacturing the cylindrical filter 10 shown in FIG. 1.

While a large number of holes 41 with the same diameter are formed over the entire surface of the perforated metal 40, a thickness (t1) in a region corresponding to the S1 region of the cylindrical filter 10 and a thickness (t2) in a region corresponding to the S2 region differ from each other and satisfy a relationship of t1<t2. Moreover, a region corresponding to the S1 region can be provided only on either one end.

The thickness (t1) and the thickness (t2) favorably satisfy t1/t2=0.3 to 0.7.

While FIG. 5 shows a discreteness between the thickness (t1) and the thickness (t2). The thickness may be continuously varied so that a discreteness does not exist between the thickness (t1) and the thickness (t2).

While the holes 41 share the same diameter in FIG. 5, the number and diameter of the holes can be varied between the region corresponding to the S1 region and the region corresponding to the S2 region in order to adjust compressive strength.

Figure 4:
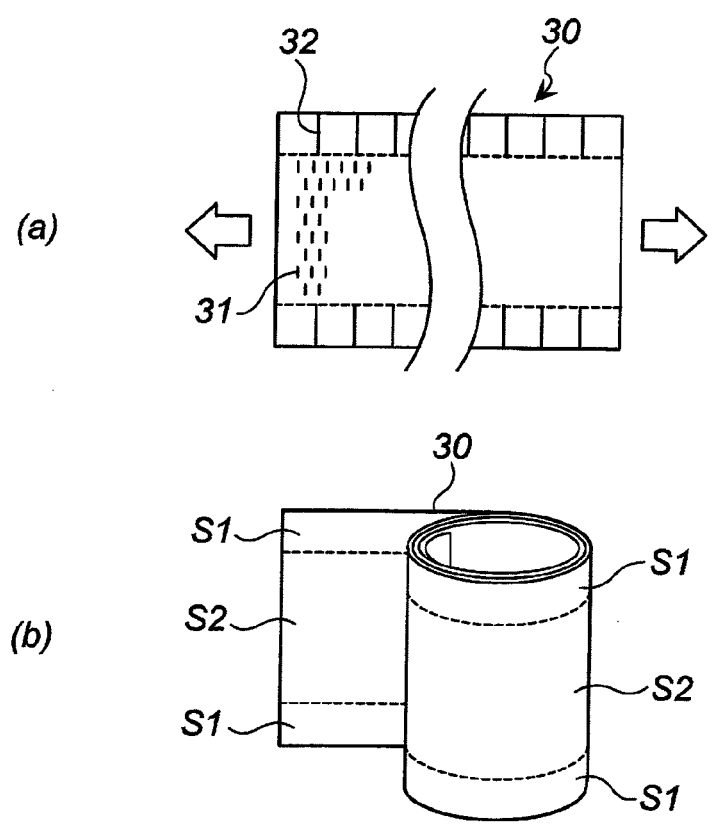
FIG. 4 shows an explanatory diagram of a method of manufacturing the filter shown in FIG. 1.

Even when using the perforated metal 40 shown in FIG. 5, a cylindrical filter can be produced in the manner shown in FIG. 4.

Figure 6:
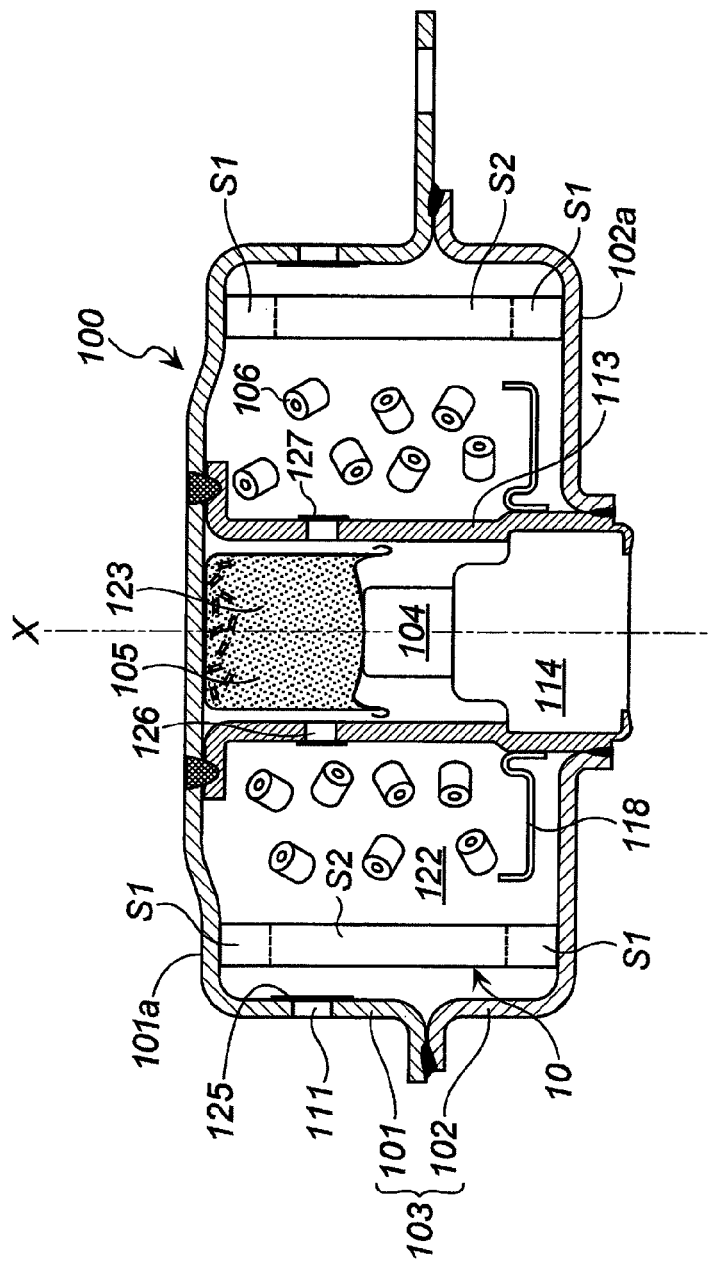
FIG. 6 shows an axial cross-sectional view of a gas generator according to the present invention.

(3) Gas Generator Shown in FIG. 6

A gas generator 100 shown in FIG. 6 is a known gas generator except that the cylindrical filter 10 in FIG. 1 is provided, and a short-passing preventing member is not provided and, for example, a structure that is substantially the same as the gas generator shown in FIG. 1 of JP-A No. 2000-198409 can be adopted.

An outer shell of the gas generator 100 is formed by a diffuser shell 101 provided with a gas discharge port 111 and a closure shell 102 which forms a housing 103 in combination with the diffuser shell 101. The gas discharge port ill is closed by a seal tape 125 in order to prevent penetration of outside air.

Inside the housing 103, an inner cylindrical member 113 is disposed concentrically (on the axis X) with the housing 103, whereby a igniter chamber 123 is formed therein and a combustion chamber 122 is formed outside thereof.

An electric igniter 104 and a transfer charge 105 are accommodated in the igniter chamber 123. The combustion chamber 122 is charged with a gas generating agent 106.

While the inner cylindrical member 113 has a flame-transferring hole 126 that communicates the igniter chamber 123 with the combustion chamber 122. Prior to activation, the flame-transferring hole 126 is closed by the seal tape 127.

The cylindrical filter (coolant/filter) 10 shown in FIG. 1 is disposed so as to enclose an outer periphery of the combustion chamber 22. The cylindrical filter 10 is press-contacted and fixed between a top plate 101a of the diffuser shell 101 and a bottom plate 102a of the closure shell 102.

When the cylindrical filter 10 is attached in this state, for example, the cylindrical filter 10 is attached according to the following procedure.

(i) The inner cylindrical member 113 is welded and fixed to the diffuser shell 101.

(ii) The cylindrical filter 10 is disposed on the top plate 101a of the diffuser shell 101, and after charging the gas generating agent 106, a retainer 118 is press-fitted into the inner cylindrical member 113.

(iii) Subsequently, the diffuser shell 101 and the closure shell 102 are aligned and pressed against one another, and the cylindrical filter is press-contacted and fixed between the top plate 101a of the diffuser shell 101 and the bottom plate 102a of the closure shell 102.

(iv) The diffuser shell 101 and the closure shell 102 are then welded and fixed. Subsequently, the transfer charge 105 is charged into the inner cylindrical member 113 and the electric igniter 104 is fixed.

A height (H) of the cylindrical filter 10 is adjusted to be slightly longer than a distance between the top plate 101a and the bottom plate 102a, and since there are S1 region with a low compressive strength in both end surfaces 11a and 11b of the cylindrical filter 10, the both end surfaces 11a and 11b are squashed during the attaching process described above.

By being squashed in this manner, the both end surfaces 11a and 11b of the cylindrical filter 10 tightly attached to the top plate 101a and the bottom plate 102a.

Therefore, even when the gas generator 100 is activated, short-passing of combustion gas, that is, passing between both end surfaces 11a and 11b of the cylindrical filter 10 and the top plate 101a and the bottom plate 102a, can be prevented.

Consequently, in addition to reducing the weight of the filter itself in comparison to those in which a metallic mesh or wires are woven in many layers and then compression-molded and those in which a wire is wound in many layers, since a cushion member 50 having a short-passing preventing portion 51 in the gas generator according to conventional art (for example, JP-A No. 2000-198409) is no longer necessary even though porous metal plates selected from expanded metal, metal lath, and perforated metal are used, weight can be further reduced.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A cylindrical filter for a gas generator, comprising:
   a porous metal plate forming a plurality of layers, the porous metal plate having, throughout an entire length thereof, a predetermined region S1 in at least one end in a height direction and a region S2 other than the region S1, the predetermined region S1 being provided with first holes, and the region S2 being provided with second holes, a compression strength of the predetermined region S1 being smaller than that of the region S2, the porous metal plate being configured to be provided within a gas generator housing so as to be press-contacted and fixed between a top plate and a bottom plate of the gas generator housing such that the region S1 is squashed in an axial direction and the region S2 retains an original shape,
   the porous metal plate being selected from a group consisting of expanded metal, metal lath, and perforated metal, and
   the predetermined region S1 corresponding to a region of 5 to 20% in length from both ends with respect to an overall height.

2. The cylindrical filter for a gas generator according to claim 1, wherein a difference between the compressive strengths in the regions S1 and S2 is a difference due to an opening area of the first holes per unit area in the region S1 being set greater than an opening area of the second holes per unit area in the region S2.

3. The cylindrical filter for a gas generator according to claim 1, wherein
   a difference between the compressive strengths in the regions S1 and S2 is a difference due to; an opening area of the first holes per unit area in the region S1 being set greater than an opening area of the second holes per unit area in the region S2, and
   a thickness in the region Si being set smaller than a thickness in the region S2.

4. The cylindrical filter for a gas generator according to claim 1, wherein a difference between the compressive strength in the regions S1 and S2 is a difference due to a thickness in the region S1 being set smaller than a thickness in the region S2.

5. The cylindrical filter for a gas generator according to claim 1, wherein the porous metal plate is rolled a plurality of times so as to form a cylindrical shape and a rolling end is welded and fixed.

6. A gas generator, comprising:
   the gas generator housing;
   a solid gas generating agent as a gas source provided within the gas generator housing; and
   the cylindrical filter according to claim 1, disposed in the gas generator housing, wherein
   at least one end of the cylindrical filter makes a direct contact with an inner wall surface of at least one of the top plate and the bottom plate of the gas generator housing.

7. A cylindrical filter for a gas generator, comprising:
   a porous metal plate forming a plurality of layers, the porous metal plate having, throughout an entire longitudinal length thereof, a predetermined region S1 in at least one end in a height direction and a region S2 other than the region S1, such that the predetermined region S1 has a compressive strength smaller than a compressive strength of the region S2, the porous metal plate being configured to be provided within a gas generator housing so as to be press-contacted and fixed between a top plate and a bottom plate of the gas generator housing such that the region S1 is squashed in an axial direction and the region S2 retains an original shape,
   the porous metal plate being selected from a group consisting of expanded metal, metal lath, and perforated metal, and
   the predetermined region S1 corresponding to a region of 5 to 20% in length from both ends with respect to an overall height.

* * * * *